United States Patent [19]

Niquel et al.

[11] Patent Number: 4,594,728
[45] Date of Patent: Jun. 10, 1986

[54] SYNCHRONIZATION DEVICE FOR DIGITAL FRAME TRANSMISSION

[75] Inventors: Maurice Niquel; Claude Gourdon, both of Perros Guirec; Jean Rouxel, Lannion, all of France

[73] Assignee: Lignes Telegraphiques et Telephoniques LTT, Honorine, France

[21] Appl. No.: 624,718

[22] Filed: Jun. 26, 1984

[30] Foreign Application Priority Data

Jul. 12, 1983 [FR] France .................. 83 11614

[51] Int. Cl.$^4$ ............................................. H04L 7/04
[52] U.S. Cl. ..................... 375/116; 375/114; 370/108
[58] Field of Search ............... 375/108, 111, 113, 114, 375/106, 116; 370/108; 340/146.2

[56] References Cited

U.S. PATENT DOCUMENTS

| 3,603,735 | 9/1971 | Cleobury | 375/116 |
| 4,242,755 | 12/1980 | Gauzan | 375/114 |
| 4,298,987 | 11/1981 | Stattel | 375/114 |

FOREIGN PATENT DOCUMENTS 2467516  9/1980  France .

Primary Examiner—Marc E. Bookbinder
Assistant Examiner—Andrew Telesz
Attorney, Agent, or Firm—Roland Plottel

[57] ABSTRACT

A synchronization device for digital data frame transmission system comprising an n bit series register transferring its contents at the line frequency to a parallel register also of n bits. The m first bits of the series register are also directed to a logic circuit which tests their conformity with the beginning of the synchronization word. When there is conformity, the logic circuit controls a divider dividing by n which controls, in its turn, at the line frequency divided by n, the transfer of the contents of the parallel register to a PROM memory. The purpose of the PROM is to recognize the entire synchronization word. When there is no recognition, the operation of the divide by n divider is inhibited and the procedure begins again.

8 Claims, 1 Drawing Figure

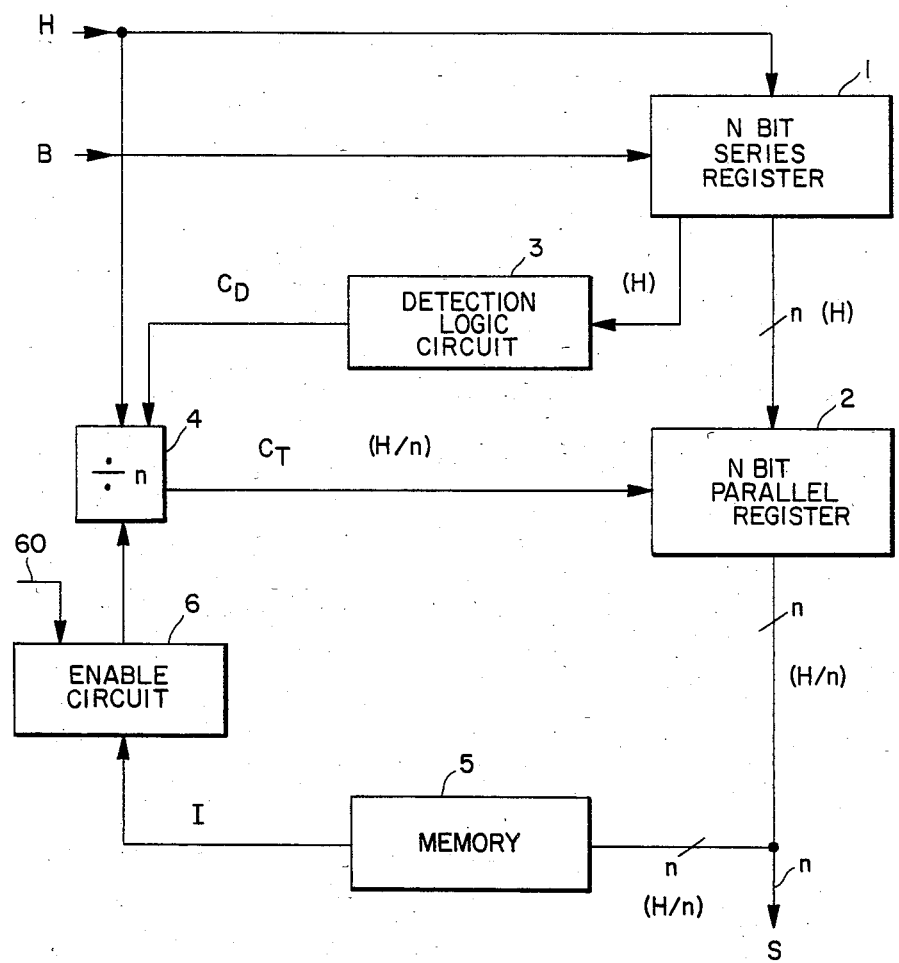

SYNCHRONIZATION DEVICE FOR DIGITAL FRAME TRANSMISSION

BACKGROUND OF THE INVENTION

1. Field of the Invention

The present invention relates to the field of digital data transmission with frames and relates more particularly to the retrieval of synchronization at reception.

2. Description of the Prior Art

When a digital data transmission, more especially a binary transmission, is carried out in blocks organized into words and frames, it is necessary at reception to retrieve the synchronization so as to be able to correctly cut up the flow of information received to retrieve the words and the frames. This is usually achieved by recognizing a synchronization word, that is to say a predefined assembly of synchronization bits, placed at a given position in the frame, generally at the beginning. The problem consists in recognizing this synchronization word in the flow of data received.

For this purpose, it is known to use a memory, in general of the PROM type. The advantages of such a solution are, first of all, that the synchronization words are sometimes long (of the order of 10 bits or so or even more) and recognizing them by means of a logic circuit of the combinative type is very complex. Also, this solution has a greater flexibility with respect to possible modifications than wired logic. The disadvantage is of a technological kind: the PROM memories available commerically at the present time are not sufficiently rapid for recognizing the synchronization in real time for high speed transmission networks, for example greater than 100M bits/second, particularly networks using optical fibers.

An object of the present invention is a synchronization device adapted to the high data rate, using a memory for recognizing the synchronization signal as a whole and a logic circuit providing accelerated preacquisition of the synchronization, over a reduced number of bits of the synchronization signal.

SUMMARY OF THE INVENTION

According to the invention, there is provided a synchronization device for digital transmission of data with frames, the data transmitted being received in series in binary form and comprising a synchronization signal, the device further receiving a clock signal representing the line frequency of the transmission, said device comprising a series register with n positions, receiving said binary data;

a parallel register with n positions receiving in parallel the contents of said series register at the timing of the clock signal;

a logic circuit ensuring detection of the first m bits of said synchronization signal and delivering a recognition signal when said m bits are detected;

a divider dividing said clock signal by n, said divider being controlled by said recognition signal;

a memory, receiving in parallel the contents of said parallel register under the control of said divider, said memory ensuring recognition of said synchronization signal by words of n bits and supplying a signal inhibiting the operation of said divider when said synchronization signal is not recognized.

BRIEF DESCRIPTION OF THE DRAWING

Other objects, features and results of the invention will be clear from the following description, in which the single FIGURE shows one embodiment of the device of the invention.

DESCRIPTION OF THE PREFERRED EMBODIMENT

In this FIGURE, a series register 1 with n positions is shown, receiving a train of binary data B transmitted by the line at the rate of a clock signal H, representing the line frequency. Thus, at a given time, n bits of the binary flow B, for example $b_i$ to $b_{i+n-1}$, are present and at the next clock signal, all of the bits are shifted by one position, bit $b_i$ being lost and bit $b_{i+n}$ replacing it at the other end. At each clock signal H, the contents of the series register 1 are transmitted in parallel (over an n-bit bus) to a parallel register 2 with n positions. A control device 4 controls, by means of a transfer control signal $C_T$, the delivery by register 2 of its contents, in parallel over an n-bit bus, forming the output signal S of the device: this signal S is therefore formed by the binary train B cut up into words of n bits.

However, this cutting up, as was recalled above, must be made in synchronism with the transmission, that is to say that it must restore the words of n bits such just as they were transmitted. This is achieved in the device of the invention in two steps.

In a first step, the first m bits contained in register 1 are also directed, in series when triggered by the clock signal H, to a so called detection logic circuit 3, whose function is to recognize the first m bits of an expected synchronization signal, comprising p bits. It is assumed here that p=n. Circuit 3 comprises for example a series register, whose structure is like that of the series register 1, and a logic circuit of the combinative type, whose form depends on the specific synchronization signal expected, supplying a recognition and divider control signal $C_D$, controlling device 4 when the beginning of the synchronization signal is recognized.

The device 4 is a divider by n, receiving also the clock signal H and dividing the signal H by n from the time when it receives signal $C_D$. Device 4 controls therefore the opening of parallel register 2 by signal $C_T$ at a rate (H/n) which is n times slower than that of the line clock H. Divider 4 may for example be formed by a counter, initialized at a value depending on the number n, whose counting is triggered by the divider control signal $C_D$.

It is then apparent that, with circuit 3 and divider 4, accelerated preaquisition of the synchronization is obtained over a reduced number (m) of bits of the synchronization signal, which comprises n bits in this example.

According to the invention, in a second step, this preacquisition is verified by means of the whole of the synchronization word, by using memory 5, for example of the PROM type. To this end, memory 5 receives from the parallel register 2 a word of n parallel bits, at the frequency H/n, which allows it to supply a signal I to the divider 4. When the word received by memory 5 is not a synchronization word, this memory is programmed so as to deliver a signal I of a type which inhibits operation of divider 4. In this case, the process is resumed at the level of the logic circuit 3 as described above. On the other hand, when this word is a synchronization word, the memory supplies a signal I of a type which does not affect the divider 4. By way of example, the word of n bits delivered by register 2 is considered as the address of a datum (I) in memory 5, I being equal to 1 in the first case above and to 0 in the second. It is thus clear that the memory operates at a speed n times less than the line speed, which allows a PROM memory to be used even for the very high frequencies H and thus the advantages to be maintained inherent in the use of a memory for detecting the synchronization, more especially the ability to process long and/or time variable synchronization signals.

The device shown in the FIGURE further comprises an enable circuit 6, inserted in the path of signal I towards divider 4. The purpose of this circuit 6, a logic type circuit formed for example by an AND gate, is to only allow inhibition of divider 4 by memory 5 when the receiver, in which the device of the invention is placed, is in a synchronization search mode, which is indicated over a control input 60.

In the preceding description, it has been assumed that the synchronization signal was expressed over p=n bits and that the cutting up which the receiver must perform, should also take place by words of n bits. In a variant, the synchronization signal may be expressed over several words of n bits, for example p=2n. The operation of the device is then substantially the same: in a first step, the recognition of the beginning of the first synchronization word by circuit 3 controls ($C_D$) the triggering of divider 4, which controls ($C_T$) the transfer of the word in question into memory 5; if the word is effectively the first synchronization word, the memory recognizes it and does not inhibit the divider 4. When the second synchronization word is received by the series register 1, the logic circuit 3 does not have to recognize it (there is no signal $C_D$), this word being recognizable only by memory 5 which, in the case where it is correct, does not send an inhibition signal (I) to divider 4. In the case where the second word is not the synchronization word expected, memory 5 sends an inhibition signal I to divider 4 as before. In this variant the logic detection circuit 3 may then be provided to process the entire n bits in the register 1 (m=n), the only limit for the number m being that the complexity of this type of logic forming circuit 3 increases very rapidly with the number of bits processed.

In a variant, when the propagation time in the circuits is not negligible with respect to the period of signal H, a register with n+1 positions is used for the series register 1, the data transmitted to circuit 3 being still formed by the first m bits and the data transmitted to register 2 being formed by the last n bits.

What is claimed is:
1. A synchronization device for digital transmission of data with frames, the data transmitted being received in series in binary form and comprising a synchronization signal having a total number p of bits, the device further receiving a clock signal (H), representing the line frequency of the transmission, said device comprising
 a series register with n positions, receiving said binary data;
 a parallel register with n positions, receiving in parallel the contents of said series register when triggered by said clock signal (H);
 a logic circuit connected to an output of said series register and ensuring detection of a first m bits of said total number p of bits of said synchronization signal and delivering a recognition signal when said m bits are detected;
 a divider dividing said clock signal by n, said divider being controlled by said recognition signal ($C_D$);
 a memory, receiving in parallel the contents of said parallel register when said contents are released therefrom under control ($C_T$) of said divider, said memory ensuring recognition of said synchronization signal by words of n bits and supplying a signal (I) inhibiting the operation of said divider when said synchronization signal is not recognized.
2. The device as claimed in claim 1, wherein the binary data received are cut up into words of n bits, said logic circuit detecting m bits with m<n, and said synchronization signal being expressed over a word of n bits.
3. The device as claimed in claim 1, wherein said binary data received are cut up into words of n bits, said logic circuit detecting m=n bits and said synchronization signal being expressed over a number of bits greater than n.
4. The device as claimed in claim 1, wherein said memory is of the PROM type.
5. The device as claimed in claim 1, further comprising means for preventing reception of said inhibition signal by said divider.
6. The device as claimed in claim 1, wherein said divider comprises a counter.
7. The device as claimed in claim 1, wherein said logic circuit comprises a second series register containing the first m bits contained in said first series register, and a logic circuit of the combinative type delivering said recognition signal.
8. The device as claimed in claim 1, whose output is formed by the input of said memory.

* * * * *